United States Patent [15] 3,647,049
Hartzell, Jr. [45] Mar. 7, 1972

[54] STEEP SLOPE BELT CONVEYOR
[72] Inventor: Harry F. Hartzell, Jr., Allison Park, Pa.
[73] Assignee: Koppers Company, Inc.
[22] Filed: May 22, 1970
[21] Appl. No.: 39,640

[52] U.S. Cl.................................198/192, 198/54, 198/198
[51] Int. Cl.....................................B65g 15/08, B65g 15/42
[58] Field of Search..................198/184, 201, 192, 193, 227, 198/198, 54

[56] References Cited

UNITED STATES PATENTS 2,966,254  12/1960  Kaiser.....................................198/201
3,545,598  12/1970  McGinnis...............................198/201

FOREIGN PATENTS OR APPLICATIONS 1,256,892  2/1961  France....................................198/201

Primary Examiner—Richard E. Aegerter
Attorney—Sherman H. Barber, Oscar B. Brumback and Olin E. Williams

[57] ABSTRACT

A steep slope belt conveyor for moving and elevating bulk material comprises a flexible belt supported by trough-shaped carrying idler rollers. Overlapping baffles mounted transversely at spaced intervals along the length of the load-carrying belt surface holds the bulk material on the belt surface and prevents such material from gravitating down the belt. The longitudinal edges of the belt are specially shaped to engage return idler rollers so that the belt maintains its troughlike contour during the return run.

1 Claim, 3 Drawing Figures

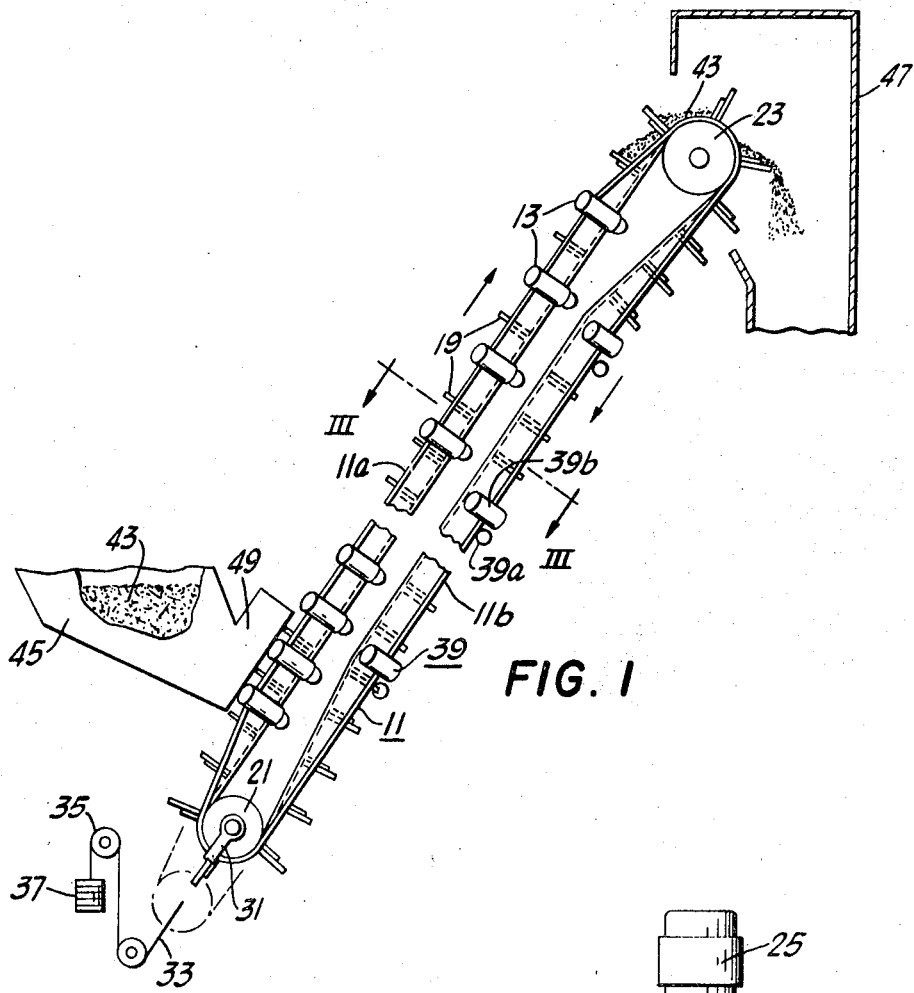
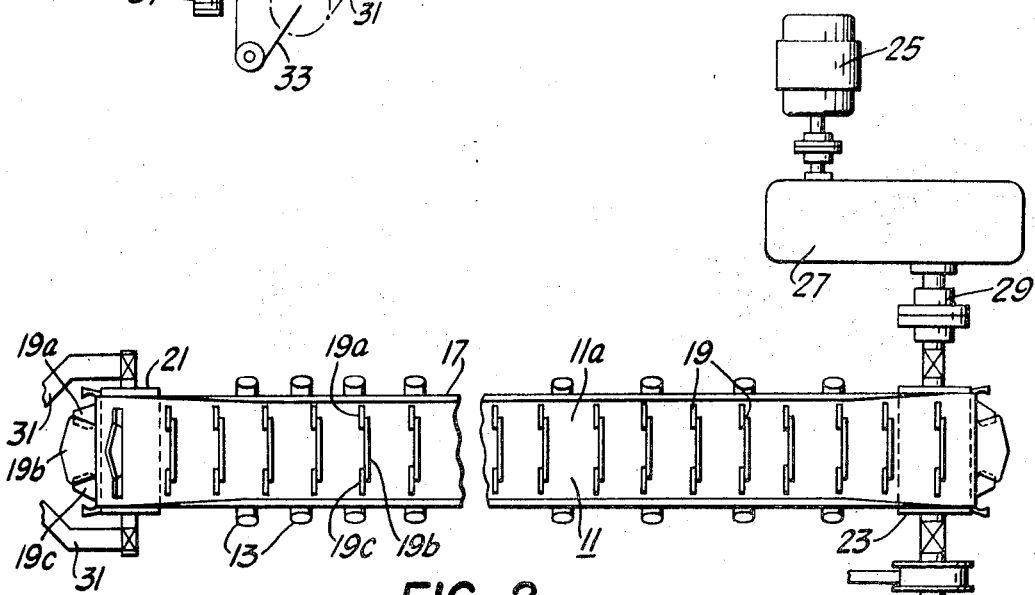

INVENTOR.
HARRY F. HARTZELL, JR.

3,647,049

STEEP SLOPE BELT CONVEYOR

BACKGROUND OF THE INVENTION

It is generally the concensus among material handling equipment designers and users that the most economical and efficient means of moving and elevating bulk materials are flexible troughed rubber-covered fabric belt conveyors. The design of such unit is well known and much used. The conventional design, however, has some inherent disadvantages that restrict the use of belt conveyors in many installations.

One well-known disadvantage of conventional types of belt conveyors is the fact that the slope or inclination to the horizontal of any conventional conveyor is restricted by the angle of repose of the material. If the slope is too great, the conveyed material slides or gravitates in a direction opposite to the direction of the belt travel. This restriction in slope requires that belt conveyors of considerable length be used to gain any appreciable increase in elevation of the conveyed material. This adds not only to the initial cost of the conveyor, but necessitates that the conveyor occupy more property than is necessary if a design of conveyor belt where available that would elevate material on a steeper slope to the horizontal.

A second disadvantage to conventional conveyor belts is the necessity that they be designed so that a relatively horizontal section of belt passes under the point at which material is loaded onto the belt. This is necessary because of the tendency of the material to roll or slide back on the belt is magnified at the loading point, and if special design consideration is not given, improper loading and excessive spillage will occur. Because special consideration must be given to the design of a belt at the loading point, the length or run of a conveyor belt is further increased to gain any given elevation.

A third disadvantage in using conventional sloped troughed belt conveyors for carrying material upwardly at the end of the load, is that, after loading has been completed, or interrupted, the material has a tendency to roll and bounce down the belt in a direction opposite to the belt's travel. This causes a safety hazard as well as a severe cleanup problem, and is particularly prevalent when the particles of material have a somewhat spherical or regular shape.

Those skilled in the art will recognize from the following description of the novel steep slope belt conveyor of the present invention, how such invention overcomes the disadvantages of the prior art conveyor belts while retaining the desirable features of conventional design.

SUMMARY OF THE INVENTION

A conveyor belt according to the invention includes spaced-apart groups of baffles mounted transversely of and to the one central baffle in each group which coact to hold material carried by the belt. The edges of the belt are formed to coact with groups of rollers that support the return run portion of the belt conveyor.

For a further understanding of the invention and for features and advantages thereof, reference may be made to the following description in conjunction with the drawing which shows, for the purpose of exemplification, one embodiment of the invention.

BRIEF DESCRIPTION OF THE DRAWINGS

In the drawings:

FIG. 1 is a schematic elevational view of a steep slope belt conveyor in accordance with the invention;

FIG. 2 is a plan view of the belt conveyor of FIG. 1; and

DETAILED DESCRIPTION

Figure 3:
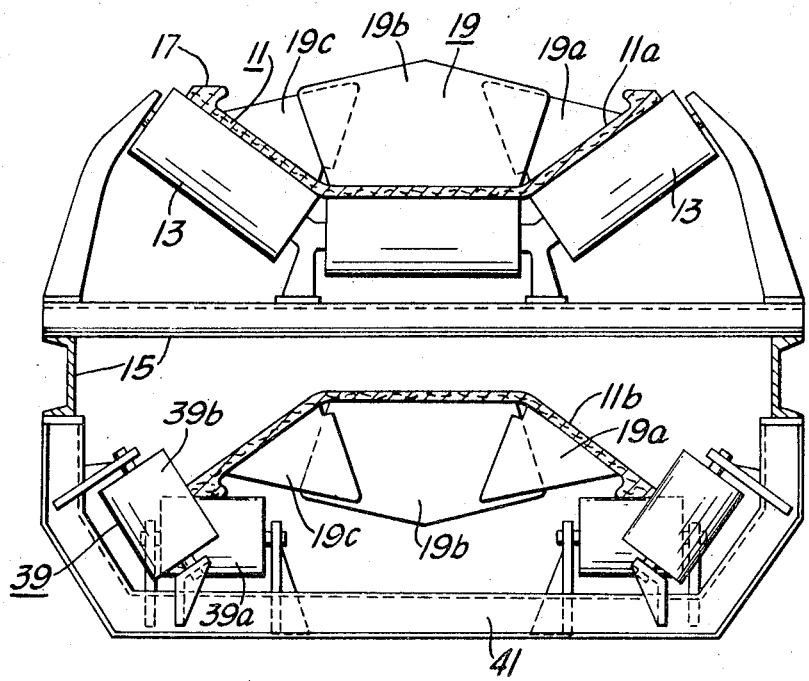
FIG. 3 is a sectional view along line III—III of FIG. 1.

Referring to FIG. 1, a flexible conveyor belt 11, comprising a carrying run 11a and a return run portion 11b, is supported on its carrying run by a plurality of spaced-apart troughed carrying idler rollers 13 of conventional construction. These idler rollers 13 are journaled in a conventional manner to stringers 15 (FIG. 3) which provide the structural frame and support for the conveyor belt 11 and its supporting idlers 13.

Conveyor belt 11 has, on both elongate side edges, specially reinforced and shaped lips 17 which provide a wearing and guiding surface for the conveyor belt 11 on its return run.

Spaced at substantially equal intervals along the length of the conveyor belt 11 are sets of overlapping baffles 19; each set of baffles 19 comprising three cooperative baffle portions 19a, 19b, and 19c. The baffle portions 19a, 19b, and 19c are molded, preferably, with the conveyor belts carrying cover or they may be fastened to the carrying cover by vulcanizing, or in any other suitable manner. These baffle portions 19a, 19b, 19c cooperate to form a transverse diaphragm extending across the conveyor belt, at selected spaced-apart intervals, and they hold bulk material in position and prevent it from rolling or sliding in the direction opposite the direction in which the belt moves.

The action of these baffles in preventing reverse roll or sliding of material on the belt, also permits loading the belt on an incline of relatively steep slope. These baffles, because of their relatively close spacing and disposition on the conveyor belt, encourage the loaded material to come to rest relative to the belt almost immediately, thereby preventing roll-back and spillage of the material.

The side baffle portions 19a and 19c are so arranged that they overlap the center baffle portion 19b on the side thereof that is in contact with and holds the bulk material being carried, so that no space can develop between the side baffle portions 19a, 19c, and the center baffle portion 19b. This arrangement of baffles permits the cross-sectional contour of the belt to change from the trough imposed on the belt by the carrying idlers 13 to a flat contour which it must assume when the conveyor belt 11 passes over a cylindrical takeup pulley or roller 21 at its lower end, and over a cylindrical friction drive pulley or roller 23 at its upper or discharge end.

The cylindrical friction drive pulley 23 is journaled in a conventional manner and is powered by a conventional electric motor 25 acting through a speed reducer 27 and coupled shafting 29. The cylindrical takeup pulley or roller 21 is also journaled in a conventional manner and is connected by means of a yoke 31 and cable 33 with pulleys 35 and a counterweight 37 that maintains proper tension in the conveyor belt system.

The return run portion 11b of the conveyor belt 11 is supported by return idler rollers 39. The idler rollers 39 are arranged in pairs on opposite sides of the conveyor belt; a horizontal roller 39a is associated with an inclined roller 39b arranged about as shown in FIG. 3. The sets of return idler rollers 39a, 39b are disposed at convenient intervals along the length of the return run 11b, and these return idler rollers 39 are journaled in a usual manner to support frame 41 that is connected to the main support stringers 15. The return idler rollers 39a, 39b of each set are disposed in adjacent parallel planes, about as shown in FIG. 1.

The horizontal return idler rollers 39a carry the weight of the return run portion 11b, since the lip portion 17 is so formed that it bears on horizontal rollers 39a. The upwardly inclined return idler rollers 39b perform a dual function; one function being to maintain the return run portion 11b in a trough shape by exerting laterally directed edge forces against the lip portion 17, and a second function being to maintain the return run 11b in proper alignment with the end rollers 21, 23.

The return idler rollers 39b are disposed at an angle of about 45° to the axis of the horizontal rollers 39a, but this angle may be varied as desired to suit any special conditions in any particular installation.

The installation illustrated in FIG. 1 shows a conveyor belt in accordance with the invention receiving bulk material 43 from a storage hopper 45 and discharging such bulk material 43 into a receiving structure or bin 47. The bulk material 43 in the storage hopper discharges therefrom over a portion of the length of the conveyor belt.

From the foregoing description, one skilled in the art will recognize several significant features and advantages among which are:

That the conveyor belt of the present invention is suitable for upwardly conveying bulk material at relatively large angles of inclination and over relatively short horizontal distances; and That such conveyor belt is adaptable for effectively moving bulk material at large angles of inclination with respect to the horizontal.

Although the invention has been described herein with a certain degree of particularity, it is understood that the present disclosure has been made only as an example and that the scope of the invention is defined in what is hereinafter claimed.

What is claimed is:

1. A flexible belt conveyor arrangement for handling bulk material including an endless conveyor belt and a pair of spaced-apart pulleys over which said conveyor belt is looped with one of said pulleys being an idler pulley and the other pulley being a power driven pulley, the improvement comprising:
   a. a lip formed integrally with each longitudinal edge of said conveyor belt;
   b. groups of baffle members mounted transversely to the load carrying surface of said conveyor belt, there being a middle and two edge baffle members comprising each group with said edge baffle members being offset with respect to said middle baffle member and overlapping the adjacent edge portions of the middle baffle member;
   c. a plurality of rollers journaled to a supporting frame at intervals therealong that support the load carrying run portion of said conveyor belt; and
   d. a plurality of groups of rollers journaled to said supporting frame at intervals along both longitudinal edges of the return run portion of said conveyor belt, each group of rollers including
      i. a horizontal roller, and
      ii. an upwardly inclined roller with such rollers being positioned in spaced-apart parallel planes, with the lip of each longitudinal edge coacting with the rollers of each group to support and maintain said return run portion in proper selected form.

* * * * *